2,741,650

STYRENE-MODIFIED POLYVINYL ACETATE RESINS

John Charles Lukman and Ora Leon Wheeler, Agawam, Mass., assignors to Shawinigan Resins Corporation, Springfield, Mass., a corporation of Massachusetts No Drawing. Application November 8, 1951, Serial No. 255,543

4 Claims. (Cl. 260—29.6)

This invention relates to new modifications of polyvinyl esters. More particularly, it relates to compositions prepared from polyvinyl esters and styrene.

Vinyl esters and especially vinyl acetate are very important commercial resins. Polyvinyl acetate is a colorless, transparent, non-toxic, thermoplastic resin. The largest use for polyvinyl acetate is in the prepartion of adhesives. It will adhere to many types of materials including absorbent surfaces such as paper, wood and leather, and non-absorbent surfaces such as metals and glass. The compatibility of polyvinyl acetate with other resins, extenders, solvents and plasticizers has also encouraged its wide use. Poylvinyl acetate has been restricted, however, to applications where elevated temperatures are not encountered. In most of such cases, harder and less compatible chlorinated polyvinyl esters or thermosetting resins have been used.

It is an object of this invention to provide a new, harder, composition containing polyvinyl acetate and a process for preparing the same.

Another object is to provide a modified polyvinyl acetate which is more heat resistant yet retains the excellent adhesive properties and the compatibility characteristics of polyvinyl acetate.

A further object of this invention is to provide a modified polyvinyl acetate with a higher softening point, in the form of beads, an aqueous dispersion, or a solution.

These and other objects are accomplished according to this invention by reacting at elevated temperatures, monostyrene with polyvinyl acetate in the presence of a polymerization catalyst. The polyvinyl acetate may be prepared by any of the well-known methods. We are concerned with the modification of polyvinyl acetate by post-treatment with styrene. This new composition is neither a copolymer nor a mechanical blend of polyvinyl acetate and polystyrene. We believe the styrene units or short polystyrene chains become grafted to the polyvinyl acetate, The following examples are illustrative of the present invention. Where parts are given, they are parts by weight.

Example I

The following ingredients are used in a typical preparation of this composition by bead polymerization:

| | Parts |
|---|---|
| Vinyl acetate (refined) | 100.0 |
| Styrene | 42.8 |
| Water | 143.0 |
| Sodium bicarbonate | 0.3 |
| Hydrogen peroxide | 0.03 |
| Polyvinyl alcohol | 0.2 |
| Benzoyl peroxide | 1.0 |

The vinyl ester is polymerized at reflux temperature in the presence of the water, sodium bicarbonate, hydrogen peroxide and polyvinyl alcohol. The polyvinyl alcohol contains 11% residual polyvinyl acetate groups and has 4% aqueous solution viscosity of 28 centipoises at 20° C. When reflux stops, signifying the completion of the polymerization reaction, the temperature is raised above 80° C. and the styrene and benzoyl peroxide are added slowly. When substantially all of the styrene has reacted, the slurry of polymer beads is allowed to cool and the beads are then separated from the aqueous layer.

The improvement in high temperature properties of the product over polyvinyl acetate is significant. For example, in testing the stiffness of this new resin by the method of Clash and Berg, ASTM D-1043-49T, the following results are obtained:

[ASTM D-1043-49T]
DEGREES TWIST VS. TEMPERATURE

| | Degrees Twist at Temperatures— | | |
|---|---|---|---|
| | 40° C. | 50° C. | 60° C. |
| Example I | 42 | 200 | 370 |
| Polyvinyl acetate, visc., 500 cp | 110 | 340 | |

The viscosity of the sample of polyvinyl acetate indicated above is measured on a one-molar solution in benzene. Degrees of twist over 200 are not very reliable but they do indicate the magnitude of the improvement brought about by this invention.

The arrangement of the styrene molecules in the polyvinyl acetate is not known. We have tried mixtures of polystyrene and polyvinyl acetate without attaining properties closely similar to this composition.

There are other indications, however, that this is no mere polyblend but an actual chemical combination. For example, only 54.9% of the product of Example I can be extracted with methanol. Only 86% of the methanol soluble fraction is polyvinyl acetate. The mentioned insoluble fraction contains a small amount which can be hydrolyzed and extracted with water.

In contrast to this, methanol will extract all of the polyvinyl acetate in a mechanical blend of polystyrene and polyvinyl acetate.

Example II

Other methods of preparation can also be used for this composition. The product of a solution porcess has substantially the same properties as the product of Example I. A typical charge and procedure are as follows:

| | Parts |
|---|---|
| Polyvinyl acetate—viscosity 15 cp. | 70 |
| Styrene | 28 |
| Benzene | 100 |
| Benzoyl peroxide | 1 |

The polyvinyl acetate is first dissolved in benzene. The solution is heated to reflux temperature and the peroxide and styrene are added. After nine hours, the reaction is substantially complete. We have found that the selection of the solvent or the peroxide is not critical.

The resin may be precipitated out of the solution or used as such. A sample precipitated with water and dried has the same improved properties as those of Example I.

Example III

Four parts of partially hydrolyzed polyvinyl acetate (polyvinyl alcohol "A") derived from polyvinyl acetate having a viscosity of 8 centipoises at 20° C. in a one-molar benzene solution and containing 30% acetate groups by weight calculated as polyvinyl acetate, and 1.5 parts of partially hydrolyzed polyvinyl acetate (polyvinyl alcohol "B") derived from polyvinyl acetate having a viscosity of 300 centipoises and containing 20% acetate groups calculated as polyvinyl acetate, are dissolved in 84 parts of warm water contained in a suitable vessel equipped with an agitator and water-cooled return condenser. After solution is complete, 0.08 part of hydrogen peroxide and 0.1 part of sodium bicarbonate are added. To the resulting mixture are added 73 parts of refined vinyl acetate and 0.3 part of the dioctyl ester of sodium sulfosuccinate which is a wetting agent. The mixture is agitated and heated at reflux temperature until a temperature of 75–80° C. is obtained and no further refluxing occurs. The resulting polyvinyl acetate emulsion is then heated and when the temperature of the emulsion is over 80° C., 33 parts of styrene and 0.8 part of benzoyl peroxide are added to the polyvinyl acetate emulsion. The batch temperature is maintained at 90° C. until substantially all of the styrene has reacted.

PROPERTIES OF EMULSION PRODUCT OF EXAMPLE III

| | |
|---|---|
| Emulsion viscosity | 450 cp. at 20° C. |
| Residual monomer | 0.47%. |
| Solids in product | 55.9%. |
| Particle size | 2–4 micron average. |
| Film—10 mil | Clear with blue tint. |
| Polymer viscosity—5% in benzene | 10 cp. at 20° C. |
| Stability | Excellent. |

The exceptional properties of these resins are well demonstrated in the Block Shear Strength test set forth in Army-Navy Aeronautical Specification AN-G-8 of April 25, 1942. The test is also described on pages 490–491 of "The Technology of Adhesives" by John Delmonte (Reinhold Publishing Corporation, 1947). Selected maple blocks are coated with 20–25 grams per square foot of the adhesive under test and then put under pressure for 8–24 hours. After conditioning, a load is applied directly to the bond between the maple blocks. The load at which the laminated blocks separate, along with the extent of "wood failure" is reported. "Wood failure" is given below in percentages to indicate the extent to which the wood gave way rather than the resin bond.

The Block Shear Strength values for the product of Example III are 3233 p. s. i. at room temperature with 8% wood failure. At 60° C., the bonds tested 2451 p. s. i. with 1% wood failure. Unmodified polyvinyl acetate emulsions in the same test gave values around 2600 p. s. i. and 5% wood failure at room temperature and only 792 p. s. i. and no wood failure at 60° C.

The polymer in this emulsion also shows improved heat resistance. When compared with polymer recovered from regular polyvinyl acetate emulsions the following results are obtained:

CLASH-BERG METHOD
[ASTM D-1043-49T]

| Polymer Recovered From— | Degrees Twist at Temperatures— | | |
|---|---|---|---|
| | 40° C. | 50° C. | 60° C. |
| Example III | 40 | 125 | 325 |
| Standard polyvinyl acetate emulsion | 250 | | |

Following the procedure described in Example III, the following examples are typical for obtaining emulsions containing 20% and 40% reacted styrene.

| Base Emulsion | Example IV | Example V |
|---|---|---|
| | Parts | Parts |
| Vinyl Acetate | 100.0 | 100.0 |
| Water | 102.7 | 135.0 |
| Polyvinyl alcohol "A" | 5.2 | 7.1 |
| Polyvinyl alcohol "B" | 1.3 | 3.1 |
| Hydrogen peroxide | 0.094 | 0.126 |
| Sodium bicarbonate | 0.12 | 0.16 |

ADDED TO THE POLYVINYL ACETATE EMULSION

| | | |
|---|---|---|
| Styrene | 25.0 | 66.7 |
| Benzoyl peroxide | 0.71 | 1.57 |
| Potassium persulfate | 0.24 | |

These emulsions are also stable, and films cast from them are translucent. In the Block Shear Strength test, the excellence of an adhesive bond made from these compositions are demonstrated.

| Product of— | Shear Bond Strength, p. s. i. | | | Wood Failure, Percent | | |
|---|---|---|---|---|---|---|
| | 20° C. | 46° C. | 60° C. | 20° C. | 46° C. | 60° C. |
| Example IV | 3,037 | 2,237 | 1,200 | 35 | 8 | 0 |
| Example V | 2,460 | 1,800 | 1,500 | 7 | 2 | 2 |

Mixtures of polyvinyl alcohol stabilized polyvinyl acetate emulsion and polystyrene emulsions do not exhibit the same physical properties as these new compositions. The polystyrene emulsion merely dilutes the adhesive powers of polyvinyl acetate. Films cast from the mechanical mixture are opaque.

In order to promote the reaction of styrene, any of the well-known polymerization catalysts may be used such as hydrogen peroxide, potassium persulfate, sodium perborate, benzoyl peroxide, acetyl peroxide, lauryl peroxide, and the like as well as mixtures of these and similar compounds. The amount is such as to promote a fairly vigorous reaction at the temperature chosen. Usually the amount used is such as to cause substantially all, i. e., 95% or more, of the styrene to react in from ½ to 9 hours. In terms of available oxygen, it is usually found that such an amount of catalyst may be used as to supply 0.01 to 0.5 part of available oxygen for every 100 parts of styrene.

Where desirable, various agents may be used to regulate the course of the reactions. For example, the pH may be adjusted with formic acid, ammonium hydroxide, or acetates or bicarbonates of alkali metals. The molecular weight may be controlled by transfer agents such as aldehydes, ketones or chlorinated hydrocarbons. The activation of peroxide initiators may be accelerated by reducing agents such as soluble sulfites or formaldehyde sulfoxylates.

The most useful compositions contain from 15% to 40% styrene for every 85% to 60% of polyvinyl acetate. The use of less than 15% styrene does not bring about any significant improvement in the properties of polyvinyl acetate at elevated temperatures. When over 40% styrene is used, the room temperature properties of the composition are less desirable.

Styrene may be added to polyvinyl acetate in a continuous, semi-continuous manner, in portions, or all at once. The temperature at which it reacts to form this new composition is the critical point. Excellent results can be obtained in a pressurized vessel with temperatures over 100° C., but no worthwhile compositions have resulted with reaction temperatures below 80° C., 80–99° C. is the preferred temperature range at atmospheric pressure. Compositions equal to those made in pressurized equipment can be made within this range.

Styrene may be added to a solution of polyvinyl acetate, a slurry of polyvinyl acetate in bead form, or to an emulsion of polyvinyl acetate. Any emulsifying agent or colloid is suitable for stabilizing bead polymerization systems. In place of the polyvinyl alcohol when styrene is added to a polyvinyl acetate emulsion, as shown in the examples, other suitable hydrophilic colloids can be used such as soluble starch, the methyl ether of cellulose, water-soluble glycol cellulose, gum tragacanth, gum acacia, sodium alginate, agar-agar, gum tragon, hydroxyethyl cellulose, sodium carboxy methyl cellulose, and the like. From 0.5 to 6.0 parts of these water-soluble agents for every 100 parts of water are adequate to stabilize the emulsions.

The emulsions formed in the presence of from 0.5 to 6.0 parts of a water-soluble polyvinyl alcohol for every 100 parts of water are superior in stability, particle size and adhesion. The viscosity of the polyvinyl alcohol is important. We have found that polyvinyl alcohols with a 4% aqueous viscosity below 4 centipoises at 20° C. are not so suitable to stabilize emulsions of this new composition within the concentration range given above.

We also prefer to keep the emulsion viscosity between 50 and 5000 centipoises. Below 50 centipoises, the stability of the emulsion is not of sufficient duration to be practical. Above about 5000 centipoises, handling characteristics and ease of application are impaired. The viscosity of the emulsion is directly dependent upon the concentration of the internal phase. We, therefore, design the emulsion charge so that between 50 and 150 parts of this composition will be dispersed in every 100 parts of water.

A surface tension depressant or wetting agent may be used in conjunction with the polyvinyl alcohol if a product having exceedingly fine particle size is desired. The agent may be one or more of the well-known wetting agents, as for example, anionic, cationic or non-ionic types, such as the alkali metal, ammonium or amine salts of fatty acids, alkali metal sulfonates of aliphatic or alkyl-aromatic hydrocarbons and salts of sulfonates of alkyl esters of dicarboxylic acids. Wetting agents available under the trade names "Santomerse #3" (dodecyl benzene sodium sulfonate), "Santomerse D" (decyl benzene sodium sulfonate), "Triton NE" (aryl alkyl polyether alcohol) and "Aerosol OT" (the sodium salt of dioctyl sulfo-succinate) are suitable. Where extremely fine particle size is desired, from 0.1 to 1.0 part of wetting agent for every 100 parts of water will be sufficient.

It is obvious that many variations may be made in the products and processes of this invention without departing from the spirit and scope thereof as defined in the appended claims.

What is claimed is:
1. A process which comprises reacting 40–15% styrene in a non-reacting liquid medium at temperatures over 80° C. in the presence of 60–85% of polyvinyl acetate, and a polymerization catalyst until the styrene is substantially polymerized.

2. A process which comprises reacting in the presence of a polymerization catalyst and at temperatures over 80° C., from 50 to 150 parts of a mixture of 60–85% polyvinyl acetate and 40–15% styrene in the presence of 100 parts of water, and 0.5 to 6.0 parts of a water-soluble hydrophilic colloid.

3. A process which comprises reacting in the presence of a polymerization catalyst and at temperatures over 80° C., from 50 to 150 parts of a mixture of 60–85% polyvinyl acetate and 40–15% styrene in the presence of 100 parts of water, and 0.5 to 6.0 parts of a polyvinyl alcohol containing 10–35% residual polyvinyl acetate groups and having an aqueous viscosity of over 4 centipoises (measured as a 4% solution at 20° C.).

4. A heat reaction product in the form of a resin emulsion of a 50–150 parts of a mixture comprising from 60% to 85% polyvinyl acetate and from 40% to 15% styrene, 100 parts of water and 0.5 to 6.0 parts of a water-soluble hydrophilic colloid, reacted at temperatures over 80° C.

References Cited in the file of this patent

UNITED STATES PATENTS

| | | |
|---|---|---|
| 2,045,963 | Redman | June 30, 1936 |
| 2,123,599 | Fikentscher et al. | July 12, 1938 |
| 2,312,925 | McBurney et al. | Mar. 2, 1943 |
| 2,320,924 | Gift | June 1, 1943 |
| 2,388,600 | Collins | Nov. 6, 1945 |
| 2,545,702 | Norris | Mar. 20, 1951 |
| 2,569,954 | Ruebensaal | Oct. 2, 1951 |

FOREIGN PATENTS

| | | |
|---|---|---|
| 999,594 | France | Oct. 3, 1951 |